Patented July 27, 1943

2,325,072

UNITED STATES PATENT OFFICE 2,325,072

PROCESS FOR THE CATALYTIC DESTRUCTIVE HYDROGENATION OF HEAVY OILS OR RESIDUES CONTAINING ASPHALT

Mathias Pier, Heidelberg, and Ernst Donath, Mannheim, Germany, assignors to Standard Catalytic Company, a corporation of Delaware No Drawing. Application February 18, 1939, Serial No. 257,208. In Germany February 19, 1938

5 Claims. (Cl. 196—53)

The present invention relates to a process for the catalytic destructive hydrogenation of heavy oils or residues containing asphalt, more particularly for the production of middle oils.

It is already known to produce valuable hydrocarbon products from liquid or fusible carbonaceous materials containing between 2 and 50 per cent by volume of asphalt (determined according to the propane-method and hereinafter sometimes called propane-asphalt) by passing these together with hydrogenating gases, at a temperature of between 300 and 500° C. over a catalyst of at least standard hydrogenating activity stationarily contained in the reaction space while maintaining such a hydrogen partial pressure of at least 250 atmospheres at which the activity of the catalyst does not substantially decrease.

A catalyst has at least standard hydrogenating activity if it is capable of bringing per liter of reaction space and per hour at least 150 litres and preferably at least 250 litres or more of hydrogen into reaction under the following conditions:

A middle oil boiling from 200° to 325° C. and having a specific gravity of 0.840, which is obtained from mineral oil by distillation (if necessary followed by an extraction treatment to obtain the required specific gravity), is passed together with hydrogen under a pressure of 200 atmospheres and at a temperature of 405° C. over the catalyst to be tested which is stationarily contained in the reaction space, the throughput being adjusted at 1.5 kilogram of oil per liter of catalyst and per hour and 3 cubic meters of hydrogen measured under normal conditions of temperature and pressure being introduced per kilogram of oil.

With initial materials which require a high temperature in order to be sufficiently split, say a temperature between 450° and 550° C., however, not entirely satisfactory results are obtained due to the fact that asphalts separate off and are easily converted to coke, which makes it necessary to interrupt the operation. These difficulties may be overcome by working in stages and first reducing the asphalts at temperatures below 450° C. and then subjecting the material to the splitting treatment at the higher temperature required therefor.

We have now found that the catalytic destructive hydrogenation of heavy oils or residues containing asphalt can be readily carried out even when working in one stage without difficulties due to the asphalts present and with small gas formation and a correspondingly small hydrogen consumption, middle oils, especially Diesel oil of the best quality and in a good yield being obtained, if the initial materials are treated together with hydrogen at temperatures between 450° and 550° C. in the presence of hydrogenating catalysts, the activity of which lies below that of catalysts of standard hydrogenating activity, with a throughput of more than 0.5 kilogram, advantageously more than 1.0 kilogram of initial material per liter of reaction space and per hour, under a hydrogen pressure above 250 atmospheres, adjusted within a range at which the asphalts (determined according to the propane-method) are reduced to a content of less than about 6 per cent, advantageously of less than 3 per cent, 30 to 70 per cent, advantageously 35 to 60 per cent, of liquid constituents boiling up to 350° C. (calculated on the liquid final product) being newly formed.

High boiling constituents contained in the final products may be returned while still hot to the reaction vessel or to the preheater, so that they are further converted into the desired end products.

The asphalt determined according to the method of Holde is thereby reduced to less than 2, advantageously less than 1 per cent.

As examples of catalysts, the activity of which lies under that of the catalysts of standard hydrogenating activity may be mentioned porous substances, such as brown coal small coke, active carbon, iron oxide, bleaching earth, silica gel, diatomaceous earth, magnesia and the like, which substances may be employed as such or together with small amounts of other substances, especially with small amounts of oxides or other compounds of the metals of the 5th and 6th group, further iron sulphate, nickel sulphate or other sulphates. The substances added as catalysts, preferably in finely divided state, may change their composition before or during the reaction.

As initial materials may be employed those heavy oils or residues, which contain about 6 to 65 per cent of asphalt (determined according to the propane method), for example, those derived from tars and crude oils; further liquid or fusible residues of the destructive hydrogenation, cracking or extraction of solid or liquid carbonaceous materials, such as coal, tars and mineral oils. More particularly the process is of importance for the treatment of materials which require a high temperature to be sufficiently split.

For the determination of the asphalts according to the propane method a certain volume of the initial material is treated with about 3 to 6 times its volume of liquefied propane at about 60° C. and under a pressure slightly above the vapor pressure of the propane at this temperature. Hereby the asphalts are precipitated and two layers are formed. The asphalts are separated and the volume thereof determined.

When determining the propane-asphalt (i. e., asphalt determined as afore described) in the final product it is advisable to remove the lower boiling constituents by distillation (which is of no influence on the result) and to determine the amount of asphalt only in the enriched residue.

The precise reaction conditions to be used for a certain initial material and for a certain catalyst are determined by preliminary experiments, whereby throughput, temperature and hydrogen pressure should be so regulated, that the above-mentioned results are obtained, which conditions will then allow of working in a continuous operation as well as to obtain the highest-possible yield, lowest gas formation, best possible efficiency of the reaction space as also good quality of the reaction products, in particular of the middle oil.

The preliminary experiments may be carried out as follows:

The initial material, for example, the cracking residue of a crude oil, is subjected in the presence of a catalyst to be employed in accordance with the present invention at a temperature lying a little above 450° C. at different hydrogen pressures above 250 atmospheres, for example at 300, 500 and 700 atmospheres, and with varying throughput, for example with 0.7, 1.2 and 1.7 kilograms per liter of reaction space, to destructive hydrogenation. From the examination of the reaction product obtained in each case it is then seen whether the prescribed results as regards the asphalt content and the formation of middle oil are obtained. If the conditions have been fulfilled, then the temperature and the throughput can still be raised, whereby their results can usually still further be improved. Under the conditions ascertained in this way the destructive hydrogenation is then carried out.

From the following compilation the pressure range determined in the above indicated manner for cracking residues of crude oils with varying asphalt content can approximately be seen. Within this range the preliminary experiments as regards pressure and throughput should be carried out with the particular initial material to be used.

| Propane-asphalt | Hydrogen pressure at a temperature situated between 450° C. and 500° C. |
| --- | --- |
|  | Atmospheres |
| 8-35 per cent | 300-500 |
| 25-65 per cent | 400-800 |

In accordance with the propane-asphalt content of an initial material, for example about the following hydrogen pressures are determined:

| Propane asphalt | Hydrogen pressure |
| --- | --- |
|  | Atmospheres |
| 8 per cent | About 320. |
| 15 per cent | About 360. |
| 33 per cent | About 450. |
| 50 per cent | About 550. |
| 60 per cent | About 600. |

With many initial materials it is still desirable for the correct selection of the hydrogen pressure also to take into consideration the amount of the residue obtained in the vacuum distillation of the initial material at about 20 millimeters of mercury. Generally initial materials with a residue of 10 to 25 per cent are treated within a hydrogen pressure range of 300 to 500 atmospheres and materials with a residue of 25 to 50 per cent at hydrogen pressures of 400 to 800 atmospheres. In this way the following pressures have proved to be suitable with different initial materials within the scope of the indicated wide limits:

| Vacuum residue | Hydrogen pressure |
| --- | --- |
|  | Atmospheres |
| 10 per cent | 320 |
| 15 per cent | 360 |
| 25 per cent | 450 |
| 35 per cent | 550 |
| 40 per cent | 600 |

If, for example, the propane-asphalt as well as the amount of vacuum residue of an initial material has been ascertained and it has been determined thereby that on the basis of the above-mentioned statements hydrogen pressure values are obtained which are relatively far apart from each other, then it is advisable to carry out the preliminary experiment at first at the average value obtained, which will most likely lead to the desired results.

As already mentioned, throughputs of more than 0.5, for example those of 1.2 to 1.8 kilograms or more, per liter of reaction space and per hour are employed. In the treatment of initial material poor in hydrogen the lower limit and with materials rich in hydrogen the higher limit of the indicated range is preferred. It is further advantageous to select the throughput and the working temperature in such a manner within the indicated limits that more than about 200 cubic meters of hydrogen per cubic meter of reaction space and per hour enter into reaction with the initial material.

In respect of the temperature to be employed it should further be noted that it should not be so high, that dehydrogenation takes place in any disturbing degree; this is best guaranteed by selecting the temperature so low that the specific gravity of the fraction, boiling above 325° C., in the final product is not substantially higher than in the initial material, which is generally the case at temperatures between 450° and 520° C. At higher temperatures a stronger dehydrogenation occurs with corresponding increase in the specific gravity of the fraction boiling above 325° C.

The following example will further illustrate how the said invention may be carried out in practice but the invention is not limited to the said example. The percentages are by weight unless otherwise stated.

Example

A cracking residue of an asphalt base crude oil which contains 42 per cent by volume of propane-asphalt and 6 per cent of constituents boiling up to 350° C., and which yields in vacuum distillation (20 millimeters of mercury) up to 325° C., 49 per cent of residue, is mixed with 1 per cent of brown coal small coke, which has been impregnated with a solution of iron sulphate, so that the brown coal small coke contains 10 per cent of iron sulphate. By preliminary experiments the following method of operation is determined: The cracking residue provided with the catalyst is preheated together with hydrogen under a hydrogen pressure of 600 atmospheres in a gas heated tubular preheater and is passed subsequently at 485° C. through a reaction vessel of wider diameter, a throughput of 1.8 kilograms of initial material per liter of reaction space and per hour being employed. The reaction product contains 57 per cent of constituents boiling up to 350° C. and 2.5 per cent of propane-asphalt. Consequently, 51 per cent of liquid constituents boiling below 350° C. have been newly formed. The gas formation amounts to 10.6 per cent calculated on the constituents boiling below 350° C. including the formed gases. Per hour and per liter of reaction space 0.95 kilogram of constituents boiling up to 350° C. are obtained. The constituents of the reaction products which boil above 350° C. are, after removal of the catalyst and together with fresh initial material, again passed into the reaction space. In this manner 17.5 per cent of benzine and 71.5 per cent of Diesel oil with the cetene number 39 are obtained from the initial material. The total yield of hydrocarbons boiling below 350° C. amounts therefore to 89 per cent. The consumption of hydrogen amounts to 520 cubic meters per ton of products boiling up to 350° C.

When working under a hydrogen pressure of 320 atmospheres, then with a throughput of 0.44 kilogram per liter of reaction space and per hour a product with 56 per cent of constituents boiling up to 350° C. is obtained. The gasification amounts to 16 per cent and the propane-asphalt content of the reaction product amounts to 9.5 per cent by volume. The yield with relation to space and time amounts to 0.22 kilogram of products, boiling up to 350° C., per liter of reaction space and per hour; the new formation of constituents boiling up to 350° C. amounts to 50 per cent. Besides, for a continuous operation without disturbances the double amount of catalyst is needed. The yield of benzine and Diesel oil is 85 per cent, when the constituents boiling above 350° C. are passed back. The Diesel oil has the cetene number 32. The consumption of hydrogen amounts to about 610 cubic meters per ton of products boiling up to 350° C. Compared with the manner of working claimed, the results of the comparative experiment are therefore in every respect substantially less favorable.

What we claim is:

1. A process for the catalytic destructive hydrogenation of heavy oils or residues containing asphalts for the production of middle oils, which comprises treating the initial material with hydrogen at a temperature between 450° and 550° C., in the presence of a hydrogenating catalyst the activity of which lies below that of catalysts of standard hydrogenating activity, with a throughput between 0.5 and 1.8 kilograms of initial material per liter of reaction space per hour, and at a hydrogen pressure which ranges between a pressure determined in accordance with the propane-asphalt content of the initial material so that the hydrogen pressure is about 320, 360, 450, 550 and 600 atmospheres for about 8, 15, 33, 50 and 60 per cent of propane-asphalt, respectively, and a pressure determined in accordance with the amount of vacuum residue of the initial material remaining after distillation at about 20 millimeters of mercury up to about 325° C. of about 320, 360, 450, 550 and 600 atmospheres with a vacuum residue amounting to about 10, 15, 25, 35 and 40 per cent, respectively.

2. In the process as claimed in claim 1, applying as initial materials hydrocarbons which require a high temperature to be sufficiently split.

3. In the process as claimed in claim 1, applying as the catalyst a porous substance.

4. In the process as claimed in claim 1, applying as the catalyst a porous substance together with a small amount of a compound of a metal selected from the group consisting of the metals of the 5th and 6th group of the periodic system.

5. In the process as claimed in claim 1, applying as the catalyst a porous substance together with a sulphate of a metal of the iron group.

MATHIAS PIER.
ERNST DONATH.